(12) United States Patent
Tatsumi et al.

(10) Patent No.: US 11,201,788 B2
(45) Date of Patent: Dec. 14, 2021

(54) DISTRIBUTED COMPUTING SYSTEM AND RESOURCE ALLOCATION METHOD

(71) Applicant: Hitachi, Ltd., Tokyo (JP)

(72) Inventors: Ryosuke Tatsumi, Tokyo (JP); Akira Yamamoto, Tokyo (JP); Shugo Ogawa, Tokyo (JP); Yoshinori Ohira, Tokyo (JP); Koji Hosogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/015,336

(22) Filed: Sep. 9, 2020

(65) Prior Publication Data

US 2021/0243082 A1 Aug. 5, 2021

(30) Foreign Application Priority Data

Jan. 31, 2020 (JP) .............................. JP2020-015903

(51) Int. Cl.
*G06F 15/173* (2006.01)
*H04L 12/24* (2006.01)
*H04L 29/08* (2006.01)

(52) U.S. Cl.
CPC .......... *H04L 41/0893* (2013.01); *H04L 67/10* (2013.01)

(58) Field of Classification Search
CPC ........................... H04L 41/0893; H04L 67/10
See application file for complete search history.

(56) References Cited

U.S. PATENT DOCUMENTS

| 2002/0166033 A1* | 11/2002 | Kagami | G06F 3/0632 711/148 |
| 2007/0007999 A1* | 1/2007 | Graham | G11C 16/0416 326/38 |

FOREIGN PATENT DOCUMENTS

WO 2014/147657 A1 9/2014

* cited by examiner

*Primary Examiner* — Hua Fan
(74) *Attorney, Agent, or Firm* — Mattingly & Malur, PC

(57) ABSTRACT

In a distributed computing system, a bottleneck for performance of a network is avoided and a high-performance scalable resource management function is achieved. The distributed computing system includes a plurality of components connected to each other via a network. Each of the components includes a plurality of compute nodes, a plurality of drive casings, and a plurality of storage devices. The network includes a plurality of network switches and is configured in layers. When a storage region is to be allocated to a compute node among the compute nodes, a managing unit selects, from the storage devices, a storage device related to the storage region to be allocated or selects, from the drives, a drive casing related to the storage region to be allocated, based on a network distance between two of the compute node, the storage device, and the drive casing.

4 Claims, 16 Drawing Sheets

FIG. 7

[LV ALLOCATION REQUEST INFORMATION]    502

| REQUEST ID (5021) | CAPACITY (5022) | ALLOCATION DESTINATION COMPUTE NODE ID (5023) | LV GENERATION REQUIRED OR NOT (5024) | ATTRIBUTE (5025) |
|---|---|---|---|---|
| 1 | 50 TB | 1 | NOT REQUIRED | NORMAL |

FIG. 8

[LV ARRANGEMENT MANAGEMENT INFORMATION]    511

| LV ID (5111) | CONTROLLER ID (5112) | TARGET PORT ID (5113) | ALLOCATION DESTINATION COMPUTE NODE ID (5114) |
|---|---|---|---|
| 1 | 1 | 1 | NOT ALLOCATED |
| 2 | 2 | 1 | 1 |
| ⋮ | ⋮ | ⋮ | ⋮ |

FIG. 9

[COMPUTE NODE MANAGEMENT INFORMATION]
512

| COMPUTE NODE ID (5121) | SWITCH ID (5122) |
|---|---|
| 1 | 1 |
| 2 | 1 |
| ⋮ | ⋮ |

FIG. 10

[STORAGE DEVICE MANAGEMENT INFORMATION]
513

| CONTROLLER ID (5131) | SWITCH ID (5132) |
|---|---|
| 1 | 1 |
| 2 | 2 |
| ⋮ | ⋮ |

FIG. 11

[DRIVE CASING MANAGEMENT INFORMATION]
514

| DRIVE BOX ID (5141) | SWITCH ID (5142) |
|---|---|
| 1 | 2 |
| 2 | 2 |
| ⋮ | ⋮ |

FIG. 12

[SWITCH CONNECTION MANAGEMENT INFORMATION]

515

| SWITCH ID (5151) | SWITCH ID (5152) |
|---|---|
| 1 | 10 |
| 2 | 10 |
| ⋮ | ⋮ |

FIG. 13

[LV MANAGEMENT INFORMATION]

531

| LV ID (5311) | ALLOCATION DESTINATION COMPUTE NODE ID (5312) |
|---|---|
| 1 | NOT ALLOCATED |
| 2 | 1 |
| ⋮ | ⋮ |

FIG. 14

[STORAGE REGION SEGMENT MANAGEMENT INFORMATION]    532

| SEGMENT ID (5321) | DRIVE CASING ID (5322) | DRIVE ID (5323) | ALLOCATION DESTINATION CONTROLLER (5324) |
|---|---|---|---|
| 1000 | 1 | 1 | 2 |
| 2000 | 1 | 2 | 1 |
| ⋮ | ⋮ | ⋮ | ⋮ |

FIG. 15

[PAGE MANAGEMENT INFORMATION]    533

| PAGE ID (5331) | SEGMENT ID (5332) | INTRA-SEGMENT ADDRESS (5333) | ALLOCATION DESTINATION LV ID (5334) | INTRA-LV ADDRESS (5335) |
|---|---|---|---|---|
| 1 | 1000 | 1100 | 2 | 3000 |
| 2 | 1000 | 2100 | NOT ALLOCATED | – |
| ⋮ | ⋮ | ⋮ | ⋮ | ⋮ |

DISTRIBUTED COMPUTING SYSTEM AND RESOURCE ALLOCATION METHOD

CROSS-REFERENCE TO RELATED APPLICATION

The present application claims priority from Japanese application JP 2020-015903, filed on Jan. 31, 2020, the contents of which is hereby incorporated by reference into this application.

BACKGROUND

The invention relates to a distributed computing system and a resource allocation method and is suitable to be applied to a distributed computing system in which components are arranged across a plurality of network segments and storage resources are shared between the network segments, and a resource allocation method to be performed in the distributed computing system.

In large IT infrastructure for cloud computing or the like, a distributed computing system in which a plurality of servers (compute nodes) for executing a plurality of applications and a plurality of network switches are connected to each other by a plurality of network switches is built. In the distributed computing system, resource management software enables a required amount of a logical volume (LV) to be provided from a storage system to an arbitrary compute node.

In the foregoing distributed computing system, each of the storage systems includes a storage device and storage media, such as solid state drives (SSDs) or hard disk drives (HDD). The storage device virtualizes a data storage region and performs a data protection process using Redundant Arrays of Inexpensive Disks (RAIDs) or the like. The multiple SSDs or the multiple HDDs are installed in a drive box (drive casing). In recent years, with increases in performance of flash drives such as SSDs, an Ethernet-attached Bunch Of Flash (EBOF) and a Fabric-attached Bunch Of Flash (FBOF) have appeared. Each of the EBOF and FBOF has a high-performance interface (I/F) and enables a large number of drive casings to be connected to a high-performance wide-range network, such as Ethernet (registered trademark).

Conventionally, to connect a large number of compute nodes, storage devices, and driving casings to each other via a network, a hierarchical network structure in which network switches connected to the foregoing components are connected to each other via another network switch is used in general. It is known that, in this network configuration, when the compute nodes access the storage devices and storage media within the driving casings via a plurality of network switches, data that flows between the network switches increases in amount and becomes a bottleneck for performance. Especially, in a data center, when network switches are installed on different racks, floors, sites, or the like that are physically separated from each other, a network bandwidth between the switches is reduced. Therefore, in this configuration, it is desirable that the number of network switches via which data is transferred in a data transfer process be as small as possible, from the perspective of a reduction in the amount of data to be transferred via a network and a reduction in latency.

For example, WO2014/147657 describes a technique for sharing a drive box (drive casing) in which a plurality of storage devices are connected to each other via a network. According to the technique disclosed in WO2014/147657, it is possible to allocate a resource from an arbitrary drive casing to storage devices distributed in a plurality of racks in a data center, and achieve a capacity virtualization function that is efficient between a plurality of storage systems.

SUMMARY

For example, WO2014/147657 does not consider a network connection configuration between a storage device and a compute node or between the storage device and a driving casing, and cannot achieve a management function of preventing a network bandwidth from becoming insufficient due to data transfer between nodes and preventing a bottleneck for performance.

The invention has been devised under the foregoing circumstances and aims to provide a distributed computing system and a resource allocation method that can prevent a bottleneck for performance of a network and achieve a high-performance scalable resource management function in the distributed computing system in which computer nodes, storage devices, and drive boxes (driving casings) are installed across different network segments, and storage resources are shared between the network segments.

To solve the foregoing problems, according to the invention, a distributed computing system includes a plurality of components connected to each other via a network. In the distributed computing system, each of the components includes a plurality of compute nodes that activate an application and issue a request to input and output data on the application, a plurality of drives that physically store the data to be input and output in accordance with the input and output request, and a plurality of storage devices that execute a process on the data to be input to and output from the drives. The network has a plurality of network switches and is configured in layers. When a storage region is to be allocated to a compute node among the compute nodes, a managing unit selects, from the storage devices, a storage device related to the storage region to be allocated or selects, from the drives, a drive related to the storage region to be allocated, based on a network distance between two of the compute node, the storage device, and the drive.

According to the invention, in the distributed computing system in which the storage resources are shared between the network segments, it is possible to avoid a bottleneck for performance of the network and achieve a high-performance scalable resource management function.

BRIEF DESCRIPTION OF THE DRAWINGS

FIG. 7 illustrates an example of LV allocation request information 502.

FIG. 8 illustrates an example of LV arrangement management information 511.

FIG. 9 illustrates an example of compute node management information 512.

FIG. 10 illustrates an example of storage device management information 513.

FIG. 11 illustrates an example of drive casing management information 514.

FIG. 12 illustrates an example of switch connection management information 515.

FIG. 13 illustrates an example of LV management information 531.

FIG. 14 illustrates an example of storage region segment management information 532.

FIG. 15 illustrates an example of page management information 533.

DETAILED DESCRIPTION

Hereinafter, embodiments of the invention are described in detail with reference to the drawings.

(1) First Embodiment

Figure 1:
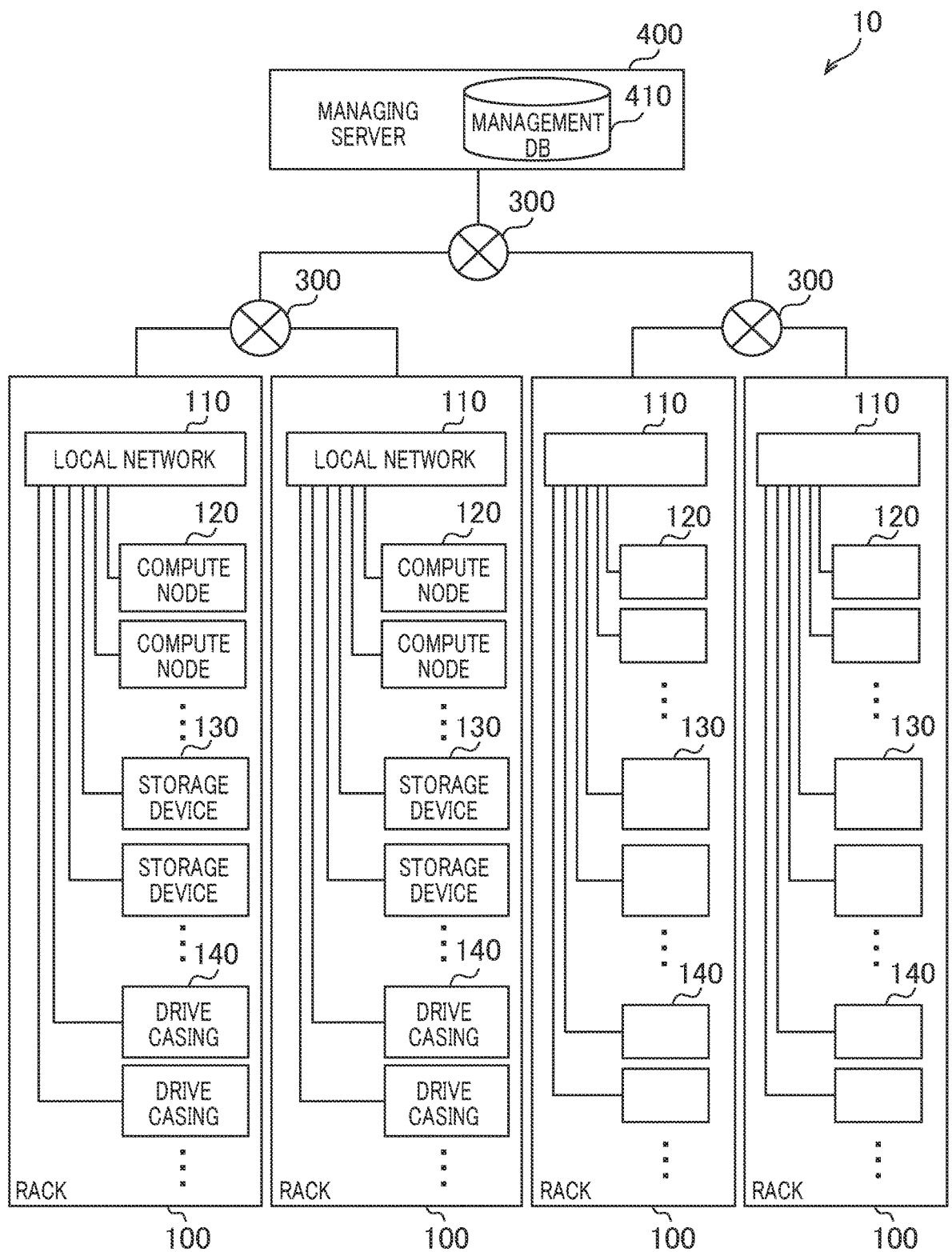
FIG. 1 is a diagram illustrating an example of a configuration of a distributed computing system 10 according to a first embodiment.

FIG. 1 is a diagram illustrating an example of a configuration of a distributed computing system 10 according to a first embodiment. As illustrated in FIG. 1, the distributed computing system 10 according to the first embodiment includes a plurality of racks 100 connected to each other via a network 300 (also referred to as global network 300 in order to distinguish the network 300 from local networks 110 described later). The racks 100 are connected to a managing server 400 via the global network 300.

Each of the racks 100 represents an IT device group connected to the same local network 110. Each of the racks 100 may not necessarily represent a single physical cabinet. In each of the racks 100, one or more compute nodes 120, one or more storage devices 130, and one or more drive boxes (drive casings) 140 are connected to each other via the same local network 110. Each of the local networks 110 is composed of one or more network switches.

FIG. 1 illustrates the local networks 110, each of which is composed of a single network switch in each of the racks 100. The configuration of each of the racks 100 included in the distributed computing system according to the first embodiment is not limited to this. For example, in each of the racks 100, a network switch (local network 110) via which compute nodes 120 are connected to storage devices 130 may be different from a network switch (local network 110) via which the storage devices 130 are connected to driving casings 140. However, to simplify the description, the following assumes that each of the local networks 110 includes a single network switch.

As illustrated in FIG. 1, in the distributed computing system 10, the compute nodes 120, the storage devices 130, and the drive casings 140 are connected to each other via the network switches across different network segments, and storage resources are shared between the network segments. The distributed computing system 10 according to the first embodiment can use a method in which data is transferred between the compute nodes 120 and the drive casings 140 via the storage devices 130.

Each of the compute nodes 120 is a calculator that issues an I/O request. Specifically, each of the compute nodes 120 is a component that has a right to access a volume when the volume is allocated to the compute node 120 from a storage resource.

Each of the storage devices 130 is a calculator that performs a data I/O process in response to an I/O request issued by a compute node 120. Specifically, each of the storage devices 130 is a component that can provide a function of controlling a volume and have a right to control the volume due to the allocation of the volume.

Each of the driving casings 140 is a device having a storage medium that is an SSD or the like and stores actual data to be subjected to the I/O process by a storage device 130. Specifically, each of the drive casings 140 is a component that can provide a storage region for storing actual data of a volume.

Figure 5:
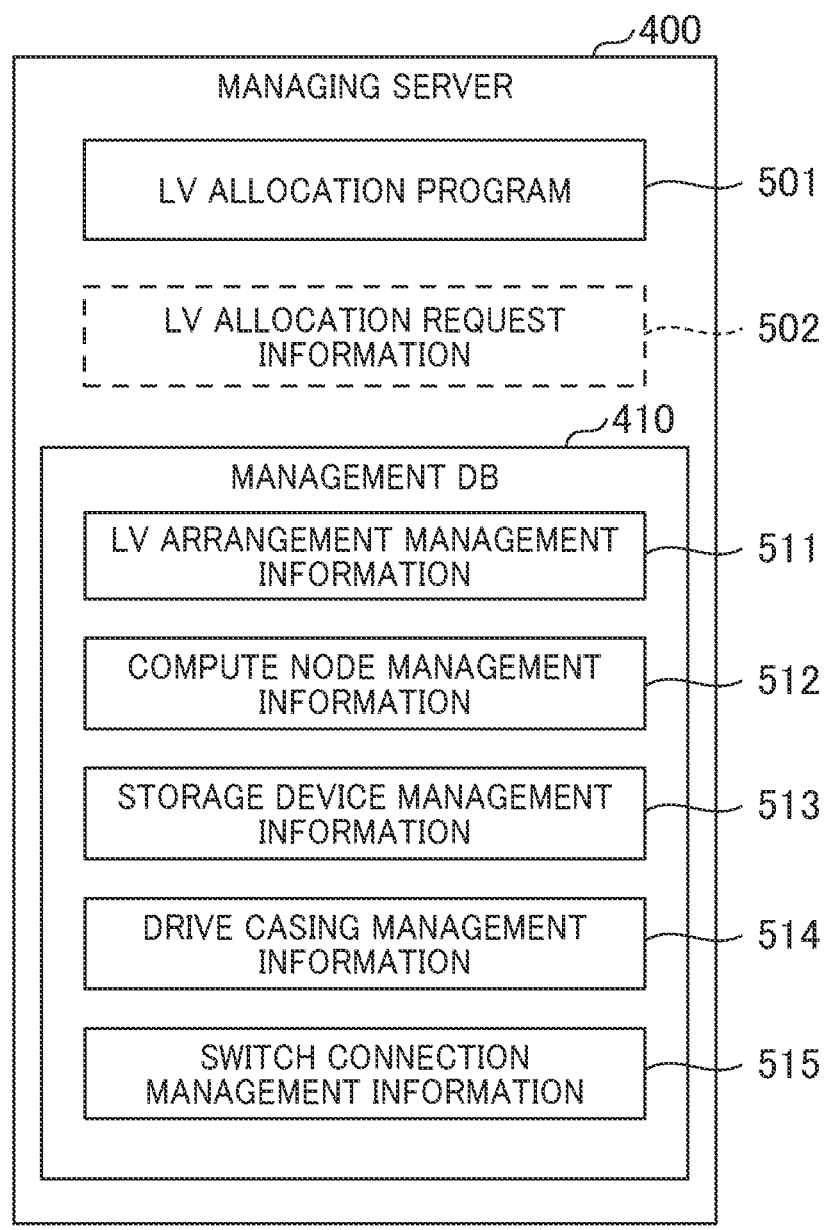
FIG. 5 is a diagram illustrating an example of a configuration of a process program and control information that are included in a managing server 400.

The managing server 400 that manages resources of the devices constituting the distributed computing system 10 is connected to the global network 300. The managing server 400 includes a management database (DB) 410 for storing arrangement information on the devices and allocation information of the resources. FIG. 5 illustrates a specific example of a process program and information that are included in the managing server 400. The managing server 400 may not be an independent server and may operate in any of the nodes. Actual data stored in the management DB 410 may not be included in the managing server 400 and may be stored at a location that is remotely accessible via the network 300.

In the first embodiment, the compute nodes 120, the storage devices 130, and the managing server 400 may not be necessarily independent devices and may be virtual machines.

Figure 2:
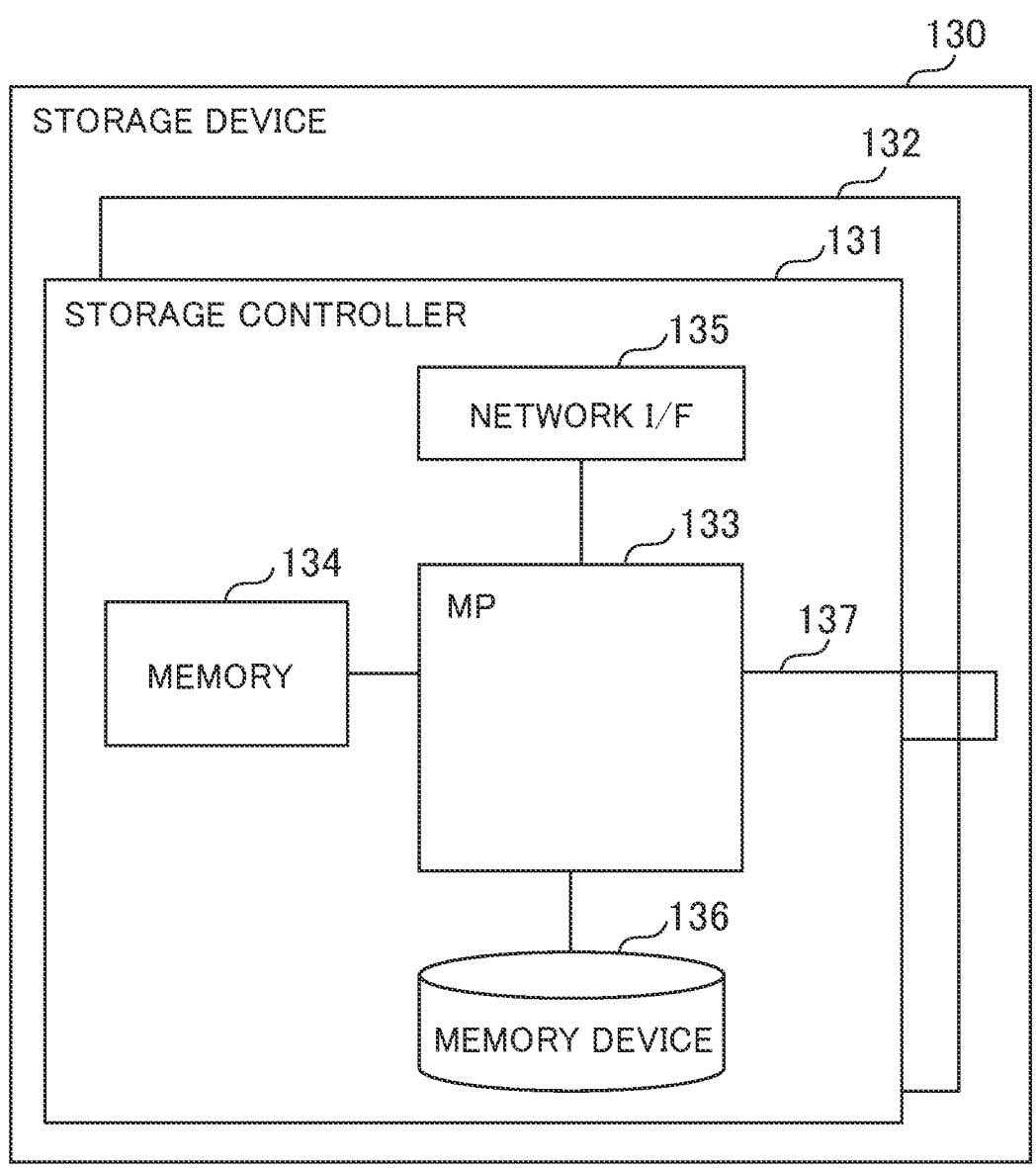
FIG. 2 is a diagram illustrating a detailed example of a configuration of a storage device 130.

FIG. 2 is a diagram illustrating a detailed example of a configuration of the storage device 130. In the storage device 130, software necessary to provide a function as storage to a compute node 120 is implemented. As an example, the storage device 130 is composed of a storage controller 131 and a storage controller 132 that are made redundant.

As illustrated in FIG. 2, the storage controller 131 includes a microprocessor (MP) 133, a memory 134, a frontend interface (network I/F) 135, and a memory device 136.

The microprocessor 133 is hardware that controls operations of the entire storage controller 131 having the microprocessor 133 installed therein. The microprocessor 133 reads and writes data from and to a corresponding driving casing 140 in accordance with a read command provided by a host computer (compute node 120) and a write command provided by the host computer (compute node 120).

The memory 134 is, for example, composed of a semiconductor memory, such as a synchronous dynamic random-access memory (SDRAM), and is used to store and hold necessary programs including an operating system (OS) and data. The memory 134 is a main storage unit for the microprocessor 133 and stores a program (storage control program or the like) to be executed by the microprocessor 133, a management table to be referenced by the microprocessor 133, and the like. The memory 134 is also used as a disk cache (cache memory) for the storage controller 131 having the memory 134 installed therein. In the storage controller 131, the microprocessor 133 executes the program stored in the memory 134, thereby executing various processes to provide a storage function to the host computer (compute node 120).

The network I/F 135 is an interface for the compute node 120. The network I/F 135 controls a protocol when the storage controller 131 communicates with the compute node 120 via the local network 110 and the global network 300.

The memory device 136 is, for example, an HDD or an SSD and stores the OS, the storage control program, a backup of the management table, and the like.

A detailed illustration of the storage controller 132 is omitted, since the storage controller 132 has the same internal configuration as that of the storage controller 131. The storage controller 131 and the storage controller 132 are connected to each other via an inter-MP I/F 137, such as non-transparent bridging (NTB), and communicate control information including user data and storage configuration information with each other via the inter-MP I/F 137. Since operations of the storage controller 132 are the same as or similar to operations of the storage controller 131, only the storage controller 131 is described below for simplicity, unless otherwise specified. It is desirable that the controllers of the storage device 130 be made redundant as the storage controllers 131 and 132 for the perspective of the improvement of availability and reliability. In the first embodiment, however, the controllers may not be necessarily made redundant. The number of controllers that are included in the storage device 130 and made redundant may be larger than 2.

Figure 3:
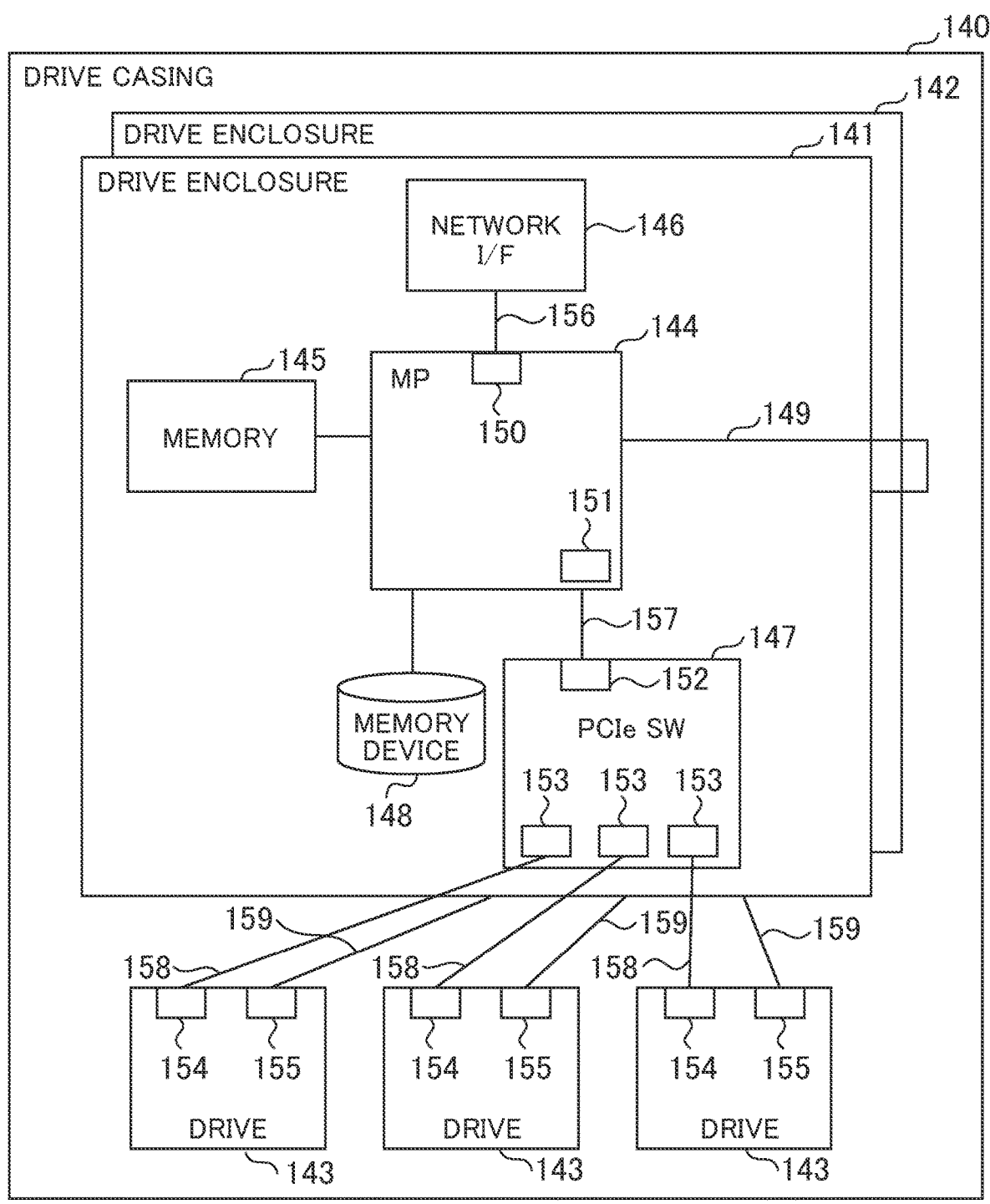
FIG. 3 is a diagram illustrating a detailed example of a configuration of a drive casing 140.

FIG. 3 is a diagram illustrating a detailed example of a configuration of the drive casing 140. The drive casing 140 is a device having software implemented therein and necessary to provide a function of controlling one or more drives 143 included in the drive casing 140 and a function of reading and writing from and to the one or more drives 143 by an external. The drive casing 140 includes drive enclosures 141 and 142 made redundant and the one or more drives 143. Although it is preferable that the drive enclosures be made redundant from the perspective of the improvement of availability and reliability of the drive casing 140, the drive enclosures may not be necessarily made redundant in the drive casing 140 according to the first embodiment. Therefore, the drive casing 140 may include the single drive enclosure 141 such that the drive enclosure 141 is not made redundant.

The drive enclosure 141 includes a microprocessor (MP) 144, a memory 145, a network I/F 146, a PCIe switch 147, and a memory device 148.

The microprocessor 144 is hardware that controls operations of the entire drive enclosure 141 having the microprocessor 144 installed therein. The microprocessor 144 reads and writes data from and to a corresponding drive 143 in accordance with a read command provided by the storage device 130 and a write command provided by the storage device 130 and transfers data to the compute node 120 in accordance with a data transfer command provided by the storage device 130.

The memory 145 is, for example, composed of a semiconductor memory, such as an SDRAM. The memory 145 is used to store and hold necessary programs including an OS and data. The memory 145 is a main storage unit for the microprocessor 144 and stores a program (drive enclosure control program or the like) to be executed by the microprocessor 144, a management table to be referenced by the microprocessor 144, and the like. The memory 145 is also used as a disk cache (cache memory) for the drive enclosure 141. In the drive enclosure 141, the microprocessor 144 executes the program stored in the memory 145, thereby executing various processes to provide a drive enclosure function to the storage device 130 and the compute node 120.

The network I/F 146 and a PCIe port 150 of the microprocessor 144 are connected to each other via a PCIe link 156. A PCIe port 151 of the microprocessor 144 and a PCIe port 152 of the PCIe switch 147 are connected to each other via a PCIe link 157.

The memory device 148 is, for example, an HDD or an SSD. The memory device 148 stores the OS, the drive enclosure control program, a backup of the management table, and the like.

A detailed illustration of the drive enclosure 142 is omitted, since the drive enclosure 142 has the same internal configuration as that of the drive enclosure 141. The drive enclosure 141 and the drive enclosure 142 are connected to each other via an inter-MP I/F 149, such as NTB, and communicate control information including user data and drive enclosure configuration information with each other via the inter-MP I/F 149. Since operations of the drive enclosure 142 are the same as or similar to operations of the drive enclosure 141, only the drive enclosure 141 is described below for simplicity, unless otherwise specified.

Each of the drives 143 is, for example, a Non-Volatile Memory express (NVMe) drive with a dual port and includes PCIe connection ports 154 and 155. Each of the drives 143 constitutes a storage region of a storage system in the distributed computing system 10 and is a storage device that stores data from the host computer (compute node 120). The PCIe connection port 154 of each drive 143 is connected to a PCIe connection port 153 of the PCIe switch 145 of the drive enclosure 141 via a PCIe link 158. The PCIe connection port 155 of each drive 143 is connected to a PCIe connection port 153 of the PCIe switch 145 of the drive enclosure 142 via a PCIe link 159. The drives 143 are not limited to the NVMe drives and may be Serial Attached SCSI (SAS) drives, Serial Advanced Technology Attachment (SATA) drives, or the like. Each of the drives 143 may not have the dual port and may have a single port.

Figure 4:
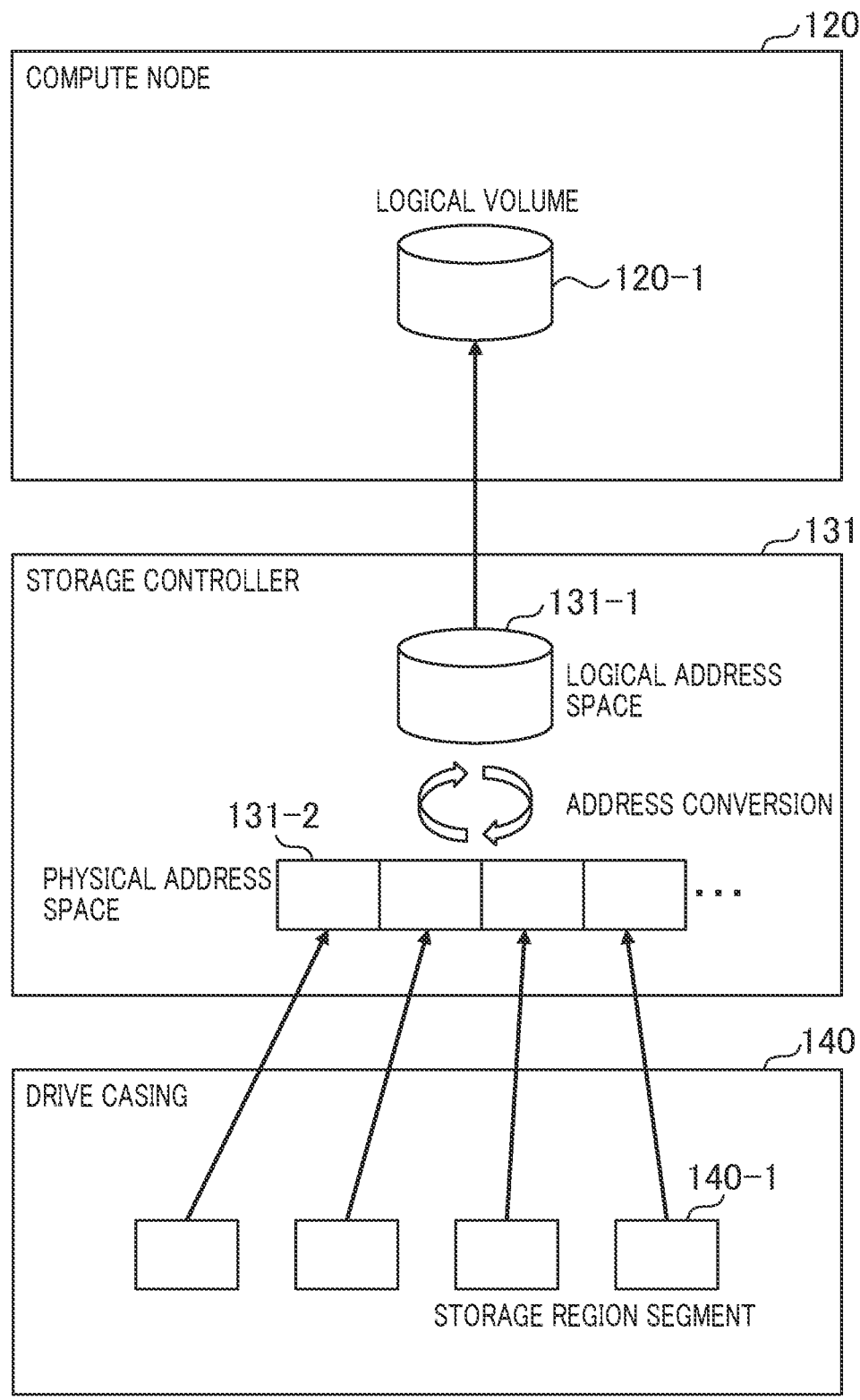
FIG. 4 is a diagram describing an overview of an address layer of a logical volume according to the first embodiment.

FIG. 4 is a diagram describing an overview of an address layer of a logical volume according to the first embodiment.

As illustrated in FIG. 4, the storage controller 131 has a logical address space 131-1 associated with a logical volume (LV) 120-1 mounted in the compute node 120. The storage controller 131 has a physical address space 131-2 associated with a storage region segment 140-1 that is an actual storage region within the drive casing 140. The storage controller 131 performs an address conversion process of converting the logical address space 131-1 and the physical address space 131-2. Since the address layer is configured, each region of an LV 110-1 of the compute node 120 is associated with the storage region segment 140-1 within the drive casing 140 via the storage controller 131. The storage controller 131 may use a RAID, erasure coding (EC), or the like to protect data of the LV provided to the compute node 120.

FIG. 5 is a diagram illustrating an example of a configuration of a process program and control information that are included in the managing server 400.

As illustrated in FIG. 5, the managing server 400 includes an LV allocation program 501 as a process program for executing an "LV allocation process" of allocating an LV based on an LV allocation request (LV allocation request information 502) from a system administrator or the like.

The "LV allocation process" to be executed by the managing server 400 includes an LV allocation process not including LV generation and an LV allocation process including the LV generation. The LV allocation process not including the LV generation is a process of selecting an LV satisfying a requested specification from LVs generated in advance and allocating the LV to a certain compute node 120 from a storage device 130 (storage controller 131). On the other hand, the LV allocation process including the LV generation is a process of generating an LV in a storage device 130 (storage controller 131) in response to a request to allocate the LV and allocating the generated LV. Details of the LV allocation process are described later with reference to FIG. 16.

The managing server 400 has the LV allocation request information 502 as temporal data held only for a time period for which the LV allocation process is performed. Details of the LV allocation request information 502 are described later with reference to FIG. 7.

In the management DB 410, LV arrangement management information 511, compute node management information 512, storage device management information 513, drive casing management information 514, and switch connection management information 515 are stored as table data of the control information.

Figure 6:
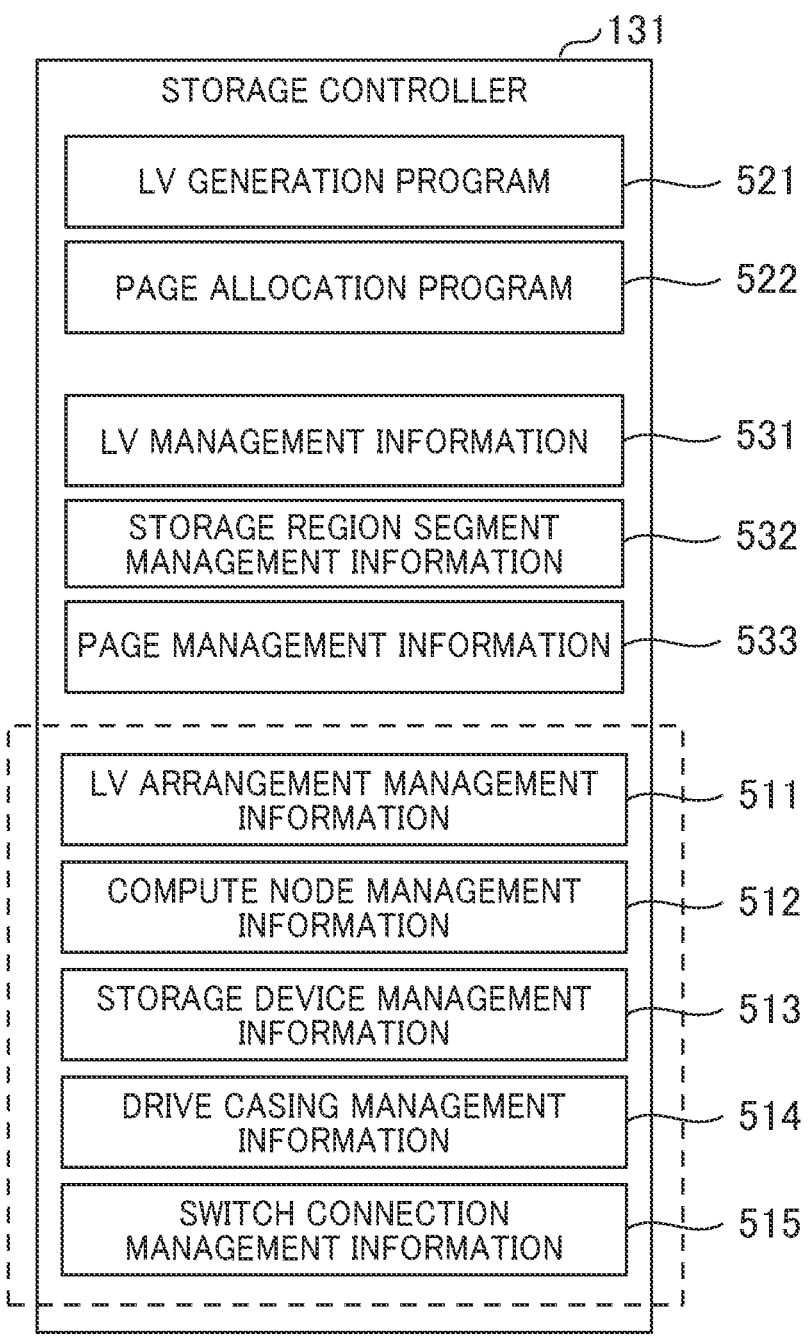
FIG. 6 is a diagram illustrating an example of a configuration of process programs and control information that are included in a storage controller 131.

FIG. 6 is a diagram illustrating an example of a configuration of process programs and control information that are included in the storage controller 131.

As illustrated in FIG. 6, the storage controller 131 includes an LV generation program 521 as a process program for executing an "LV generation process" of newly generating an LV. The storage controller 131 includes a page allocation program 522 as a process program for executing a "page allocation process" after a thin provisioning volume is generated. Details of the LV generation process are described later with reference to FIG. 17. Details of the page allocation process are described later with reference to FIG. 18.

LV management information 531, storage region segment management information 532, and page management information 533 are stored as table data of the control information in the storage controller 131. As surrounded and indicated by a broken line in FIG. 6, the storage controller 131 holds a copy of various types of control information (refer to FIG. 5) stored in the management DB 410 of the managing server 400.

A specific example of the various types of control information illustrated in FIG. 5 or 6 is described below.

FIG. 7 illustrates an example of the LV allocation request information 502. The LV allocation request information 502 is a list of parameters to be set by an administrator or a user in the managing server 400 when a command to newly allocate an LV is issued.

As illustrated in FIG. 7, the LV allocation request information 502 includes a request ID 5021, a capacity 5022, an allocation destination compute node ID 5023, LV generation required or not 5024, and an attribute 5025. The request ID 5021 is an identifier of a request to allocate an LV. The capacity 5022 is a capacity required for the LV requested to be allocated. The LV having a capacity equal to or larger than a value indicated by the capacity 5022 is allocated in the LV allocation process. The allocation destination compute node ID 5023 is an identifier of a compute node 120 in which the LV is to be mounted. The LV generation required or not 5024 indicates whether the LV is to be generated in the LV allocation process (or is required or not). The attribute 5025 is an attribute of the LV to be allocated.

FIG. 8 illustrates an example of the LV arrangement management information 511. The LV arrangement management information 511 is management information related to a generated LV and managed by the managing server 400.

As illustrated in FIG. 8, the LV arrangement management information 511 includes an LV ID 5111, a controller ID 5112, a target port ID 5113, and an allocation destination compute node ID 5114. The LV ID 5111 is an identifier of the LV and is indicated by a number or a unique name. The controller ID 5112 is an identifier of a storage controller 131 that provides the concerned LV. The target port ID 5113 is an identifier of a target port of a storage controller 131 that can access the concerned LV. The allocation destination compute node ID 5114 is an identifier of a computer node 120 in which the concerned LV is mounted. When the concerned LV is not mounted in any computer node 120, a value of the allocation destination compute node ID 5114 indicates "unallocated".

FIG. 9 illustrates an example of the compute node management information 512. The compute node management information 512 is used to manage the network switches (local networks 110) to which the computer nodes 120 are connected.

As illustrated in FIG. 9, the compute node management information 512 includes computer node IDs 5121 indicating identifiers of the computer nodes 120 and switch IDs 5122 indicating identifiers of the network switches to which the concerned compute nodes 120 are connected.

FIG. 10 illustrates an example of the storage device management information 513. The storage device management information 513 is used to manage the network switches (local networks 110) to which the storage devices 130 are connected.

As illustrated in FIG. 10, the storage device management information 513 includes storage device IDs 5131 indicating identifiers of the storage devices 130 and switch IDs 5132 indicating identifiers of the network switches to which the concerned storage devices 130 are connected.

FIG. 11 illustrates an example of the drive casing management information 514. The drive casing management information 514 is used to manage the network switches (local networks 110) to which the drive casings 140 are connected.

As illustrated in FIG. 11, the drive casing management information 514 includes drive casing IDs 5141 indicating identifiers of the drive casings 140 and switch IDs 5142 indicating identifiers of the network switches to which the concerned driving casings 140 are connected.

FIG. 12 illustrates an example of the switch connection management information 515. The switch connection management information 515 is used to manage which switches are connected to the switches.

As illustrated in FIG. 12, the switch connection management information 515 includes switch IDs 5151 indicating identifiers of the network switches (for example, switches of local networks 110) and a switch ID 5152 indicating an identifier of a higher-level network switch (for example, a switch of the global network 300) to which the concerned network switches are connected.

The management information exemplified in FIGS. 9 to 12 is updated every time a device (node) is added to or removed from the distributed computing system 10 illustrated in FIG. 1.

FIG. 13 illustrates an example of the LV management information 531. The LV management information 531 is management information related to a generated LV and managed by a storage controller 131.

As illustrated in FIG. 13, the LV management information 531 includes an LV ID 5311 and an allocation destination compute node ID 5312. The LV ID 5311 is an identifier of the LV. The allocation destination compute node ID 5312 is an identifier of a compute node 120 having the concerned LV mounted therein (refer to FIG. 4). When the concerned LV is not mounted in any compute node 120, a value of the allocation destination compute node ID 1512 indicates "unallocated".

FIG. 14 illustrates an example of the storage region segment management information 532. The storage region segment management information 532 is management information on storage region segments of the drives 143 within the drive casings 140.

As illustrated in FIG. 14, the storage region segment management information 532 includes segment IDs 5321, drive casing IDs 5322, drive IDs 5323, and allocation destination controller IDs 5324. The segment IDs 5321 are identifiers of storage region segments 140-1 within the drive casings 140 (refer to FIG. 4). The drive casing IDs 5322 are identifiers of the drive casings 140 in which the concerned storage region segments exist. The drive IDs 5323 are identifiers of the drives 143 in which the concerned storage region segments exist. The allocation destination controller IDs 5324 are identifiers of controllers to which the concerned storage region segments are allocated. In other words, the allocation destination controller IDs 5324 are identifiers of storage controllers 131 having physical address spaces 131-2 associated with the concerned storage region segments 140-1. When the concerned storage region segments are not allocated to any controller, values of the allocation destination controller IDs 5324 indicate "unallocated".

FIG. 15 illustrates an example of the page management information 533. When an LV is a thin provisioning volume, a unit of application of a physical storage region to each address is referred to as page. The page management information 533 is management information on the page.

As illustrated in FIG. 15, the page management information 533 includes page IDs 5331, segment IDs 5332, intra-segment addresses 5333, allocation destination LV IDs 5334, and intra-LV addresses 5335. The page IDs 5331 are identifiers of pages. The segment IDs 5332 indicate segments to which the concerned pages belong. The intra-segment addresses 5333 indicate top addresses within the segments to which the concerned pages belong. The allocation destination LV IDs 5334 are identifiers of LVs to which the concerned pages are allocated. When the concerned pages are not allocated to any LV, values of the allocation destination LV IDs 5334 indicate "unallocated". The intra-LV addresses 5335 are top addresses within the LVs to which the concerned pages are allocated. When the allocation destination LV IDs 5334 indicate "unallocated", values of the intra-LV addresses 5335 indicate "-(NULL)".

Next, processes to be executed by the distributed computing system 10 according to the first embodiment are described in detail using the foregoing data examples. Although the processes are executed by causing a processor to read and execute the process programs, the following description includes expressions indicating that the programs execute the processes for simplicity.

Figure 16:
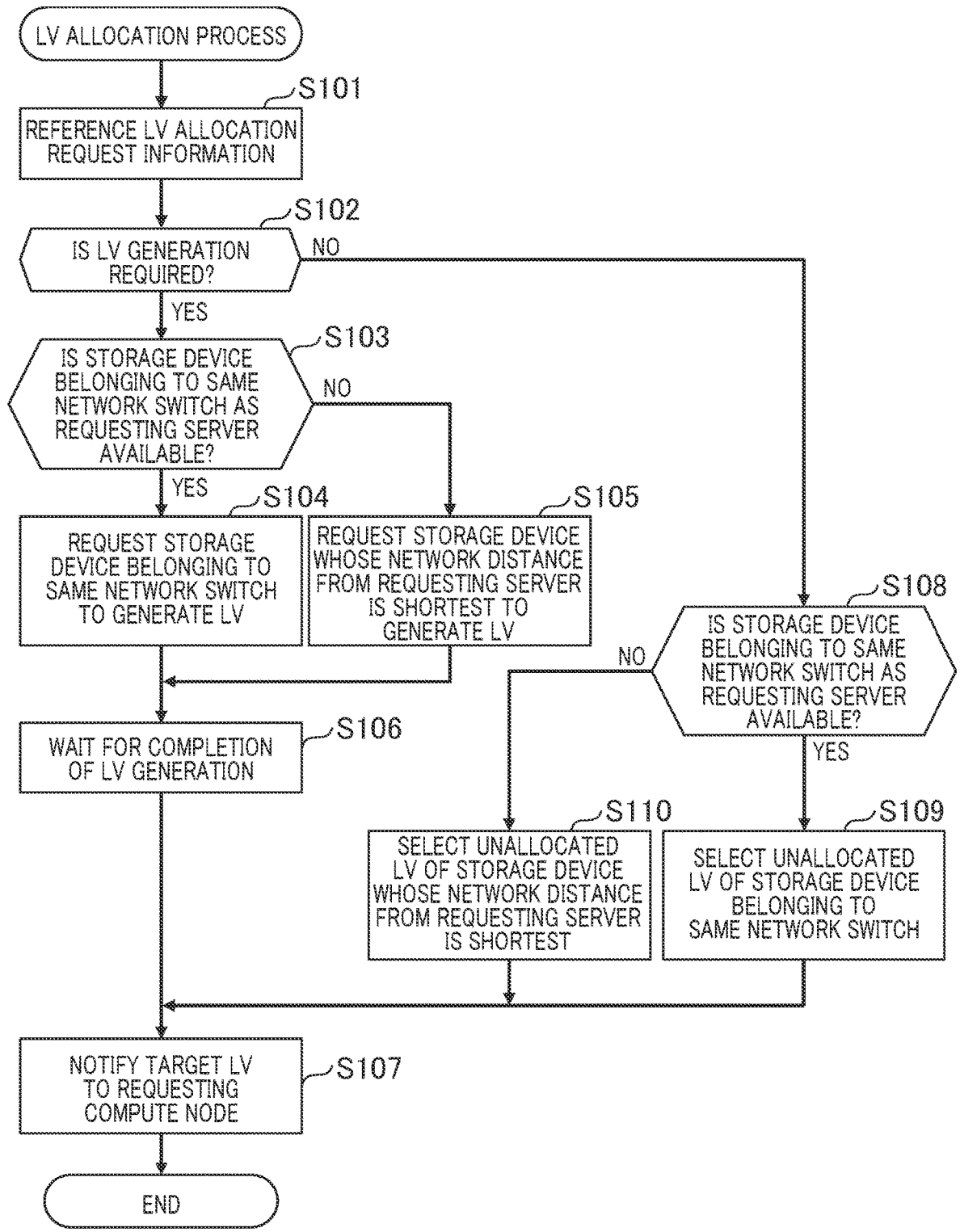
FIG. 16 is a flowchart illustrating an example of a procedure for an LV allocation process.

FIG. 16 is a flowchart illustrating an example of a procedure for the LV allocation process. The LV allocation process is a process of causing the processor of the managing server 400 to execute the LV allocation program 501 in accordance with an LV allocation request (LV allocation request information 502) from the system administrator or the like and to allocate an LV provided by a storage controller 131 to a compute node 120.

According to FIG. 16, in the LV allocation process, the LV allocation program 501 references the LV allocation request information 502 and acquires predetermined information (step S101). Specifically, the LV allocation program 501 references the LV allocation request information 502 and acquires, from a record of a request ID 5021 to be processed, a capacity 5022, an allocation destination compute node ID 5023 indicating the ID of the requesting server, LV generation required or not 5024, and an attribute 5025 of the LV. In step S101, when the LV allocation request information 502 does not exist or when the request ID 5021 is not recorded in the LV allocation request information 502, the LV allocation request does not exist and the LV allocation process is terminated.

Next, the LV allocation program 501 determines whether a value of the VL generation required or not 5024 acquired in step S501 indicates "required" (step S102). When the value of the VL generation required or not 5024 indicates "required", the process proceeds to step S103 to execute the LV allocation process including the LV generation. On the other hand, when the value of the VL generation required or not 5024 indicates "not required", the process proceeds to step S108 to execute the LV allocation process not including the LV generation.

In the LV allocation process including the LV generation (YES in step S102), the LV allocation program 501 references the LV arrangement management information 511 and the compute node management information 512 and determines whether a storage device 130 connected to the same connection switch as a connection switch of the requesting server exists in step S103. When the storage device 130 satisfying the requirement for the determination exists in step S103, the process proceeds to step S104. When the storage device 130 satisfying the requirement for the determination does not exist in step S103, the process proceeds to step S105.

In step S104, the LV allocation program 501 transmits a "request to generate an LV" to the storage device 130 connected to the same connection switch as the connection switch of the requesting server, thereby requesting the storage device 130 to generate the LV.

In step S105, the LV allocation program 501 further references the switch connection management information 515, transmits a "request to generate an LV" to a storage device 130 whose network distance (or the number of switches via which data is transferred between the storage device 130 and the requesting server) from the requesting server is the shortest, thereby requesting the storage device 130 to generate the LV.

Figure 17:
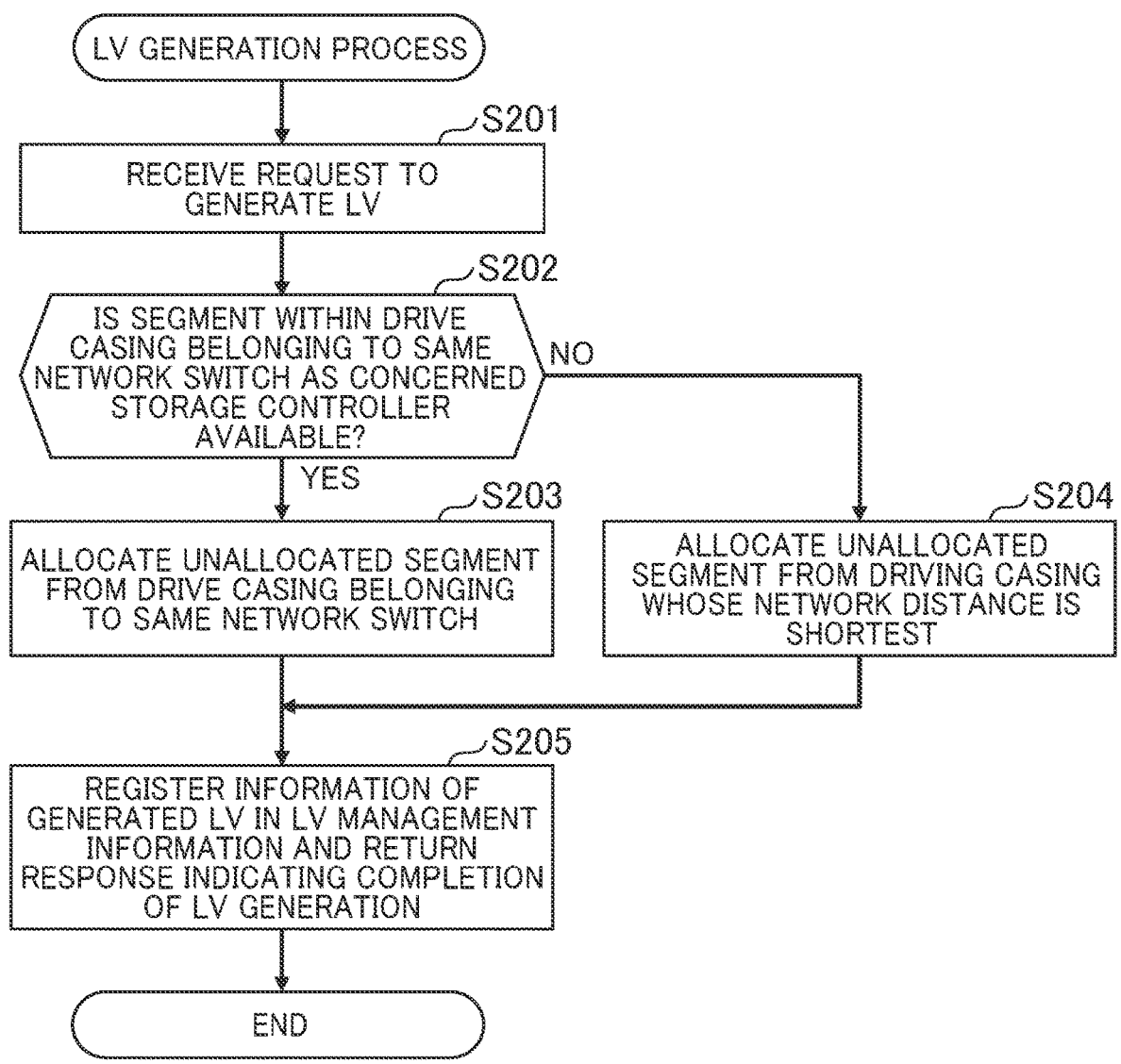
FIG. 17 is a flowchart illustrating an example of a procedure for an LV generation process.

In the storage device 130 that has received the request to generate the LV that has been transmitted in step S104 or S105, the storage controller 131 executes the LV generation program 521, thereby executing the LV generation process. FIG. 17 illustrates details of the LV generation process.

After the process of step S104 or S105, the LV allocation program 501 waits for an LV generation completion response indicating the termination of the LV generation process (step S106). When the LV allocation program 501 receives the LV generation completion response from the storage device 130 (storage controller 131), the process proceeds to step S107.

On the other hand, in the LV allocation process not including the LV generation (NO in step S102), the LV allocation program 501 references the LV arrangement management information 511 and the compute node management information 512 and determines whether an LV satisfying a specification of the LV allocation request information 502 exists in any of storage devices 130 connected to the same connection switch as the connection switch of the requesting server in step S108. When the LV satisfying the requirement for the determination exists in step S108, the process proceeds to step S109. When the LV satisfying the requirement for the determination does not exist in step S108, the process proceeds to step S110.

In step S109, the LV allocation program 501 selects one unallocated LV satisfying the specification of the LV allocation requirement information 502 from the storage device 130 connected to the same connection switch as the connection switch of the requesting server. Then, the process proceeds to step S107. When a plurality of unallocated LVs satisfying the specification of the LV allocation requirement information 502 exist in step S109, the LV allocation program 501 may select one LV from the LVs via an arbitrary selection method.

In step S110, the LV allocation program 501 further references the switch connection management information 515 and selects one LV satisfying the specification of the LV allocation request information 502 from a storage device 130 whose network distance (or the number of switches via which data is transferred between the storage device 130 and the requesting server) from the requesting server is the shortest. Then, the process proceeds to step S107. When a plurality of unallocated LVs satisfying the specification of the LV allocation request information 502 exist in step S110, the LV allocation program 501 may select one LV from the LVs via an arbitrary selection method.

By executing the processes described above, one LV to be allocated can be prepared for either a storage device 130 belonging to the same network switch to which the requesting server (compute node 120) belongs in the LV allocation process including the LV generation or in the LV allocation process not including the LV generation, or a storage device 130 whose network distance from the requesting server is the shortest in the LV allocation process including the LV generation or in the LV allocation process not including the LV generation.

Then, in step S107, the LV allocation program 501 notifies information of the LV to be allocated to the computer node 120 that is the requesting server. Details of the notified information are an ID identifying the concerned LV, an ID of the storage controller 131 that is a connection destination, an ID of a connection destination port, and the like. Then, the concerned LV is mounted in the compute node 120, which has received the notified information from the managing server 400, based on the foregoing notified information of the concerned LV so that the LV provided by the storage controller 131 is allocated to the compute node 120.

In the distributed computing system 10 according to the first embodiment, since the LV allocation process is executed in the foregoing manner, the compute node 120 that is the requesting server and the storage controller 131 (storage device 130) having the LV to be accessed by the compute node 120 can belong to the same network switch or a network distance between the compute node 120 and the storage controller 131 can be minimized.

In each of steps S105 and S109, as a specific method of minimizing the network distance under the condition that the specification of the LV allocation request (LV allocation request information 502) is satisfied, a path in which the number of network switches via which data is transferred between the storage device 130 and the requesting server is the smallest is searched. However, in the invention, the method of minimizing the network distance is not limited to the method using the number of network switches. For example, the shortest network distance may be determined in consideration of not only the number of network switches but also the fact that a bandwidth of the network path is wide and that there are many available resources for the concerned node. In addition, the concept of the shortest network distance is applicable to other similar processes (specifically, step S204 illustrated in FIG. 17, step S303 illustrated in FIG. 18, step S404 illustrated in FIG. 20, and step S503 illustrated in FIG. 21) in the invention.

FIG. 17 is a flowchart illustrating an example of a procedure for the LV generation process. The LV generation process is executed by a storage device 130 in accordance with an LV generation request from the managing server 400 in the middle of the LV allocation process. The storage controller 131 of the storage device 130 executes the LV generation program 521, thereby executing the LV generation process of newly generating an LV.

According to FIG. 17, in the LV generation process, the LV generation program 521 receives an LV generation request from the managing server 400 (step S201). When the LV generation request does not exist, the LV generation program 521 terminates the LV generation process.

Next, the LV generation program 521 references the storage device management information 513, the drive casing management information 514, and the storage region segment management information 532 and determines whether the LV can be generated in accordance with the LV generation request by allocating a storage region segment 140-1 within a drive casing 140 belonging to and connected to the same network switch to which the concerned storage controller 131 belongs (step S202). When the LV generation program 521 determines that the storage region segment 140-1 within the drive casing 140 belonging to the same network switch is available, the process proceeds to step S203. When the LV generation program 521 determines that the storage region segment 140-1 is not available, the process proceeds to step S204.

In step S203, the LV generation program 521 allocates a necessary capacity (capacity requested for the LV in accordance with the LV generation request) of the unallocated storage region segment 140-1 determined in step S202 from the drive casing 140 belonging to the same network switch, and the LV generation program 521 generates the LV.

In step S204, the LV generation program 521 further references the switch connection management information 515 and allocates a necessary capacity (capacity requested for the LV in accordance with the LV generation request) of an unallocated storage region segment 140-1 from a drive casing 140 whose network distance (or the number of switches via which data is transferred between the drive casing 140 and the storage controller 131) from the concerned storage controller 131 is the shortest, and the LV generation program 521 generates the LV.

Since the network distance between the drive casing 140 and the storage controller 131 (storage device 130) that has received the LV generation request is minimized by generating the LV in the process of step S203 or S204, the amount of data that flows in the network due to access to the LV can be minimized.

After the process of step S203 or S204, the LV generation program 521 registers information of the generated LV in the LV management information 531, returns a response indicating the completion of the generation of the LV to the managing server 400 that is the source of the LV generation request, and terminates the LV generation process (step S205).

When the LV generated in the LV generation process is a thin provisioning volume to which a page is dynamically allocated from a storage capacity pool, the LV may be generated in the storage capacity pool having the corresponding storage region segment 140-1 in step S203 or S204 without the allocation of the storage region segment 140-1.

One or multiple drive casings 140 that are selectable in steps S203 and S204 maybe determined in advance. In this case, the managing server 400 uses a network distance to determine one or multiple drive casings 140 selectable for a storage device 130 and stores information of the one or multiple drive casings 140 in the management DB 410, and the LV generation program 521 selects a driving casing 140 from the one or multiple drive casings 140. In addition, the managing server 400 may use the network distance to select the drive casing 140.

Figure 18:
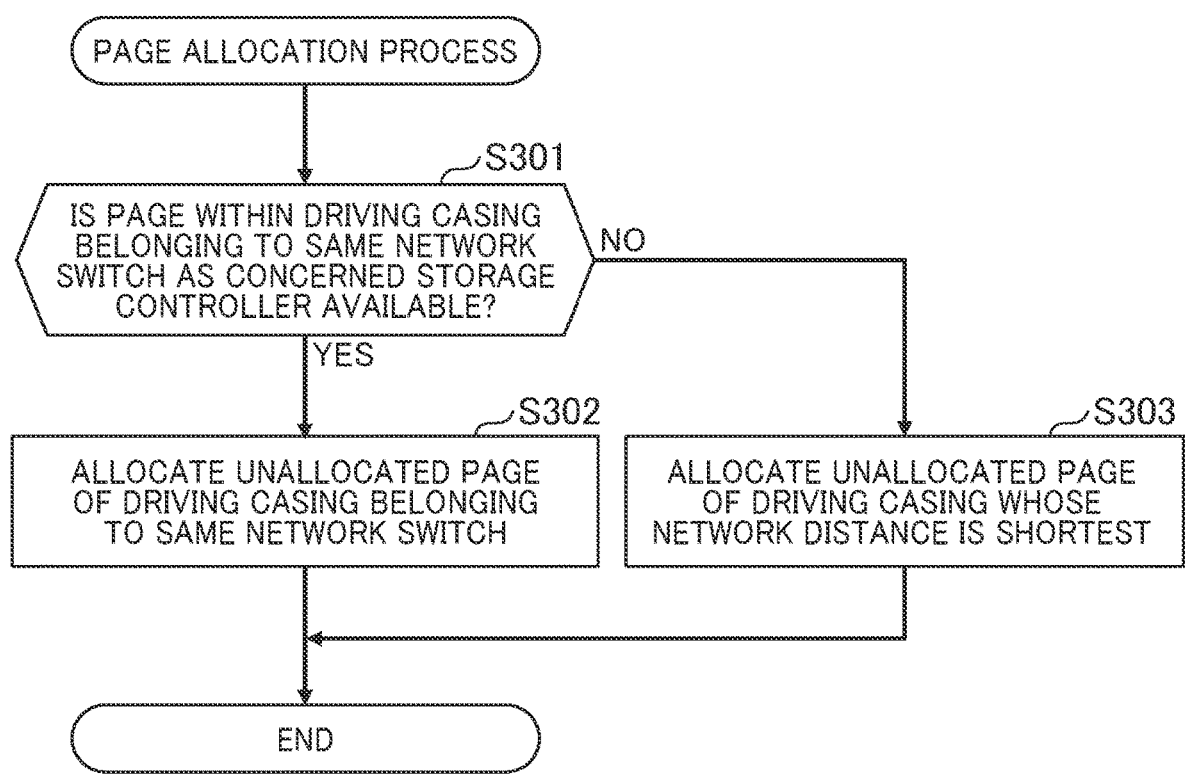
FIG. 18 is a flowchart illustrating an example of a procedure for a page allocation process.

FIG. 18 is a flowchart illustrating an example of a procedure for the page allocation process. When a thin provisioning volume is generated, a storage controller 131 executes the page allocation program 522 in response to a predetermined trigger, thereby executing the page allocation process of allocating a page. The page allocation process may not be executed at the time of the LV generation. For example, when an LV is accessed after the LV generation, the page allocation process maybe executed. Specifically, the page allocation process is executed when the storage controller 131 receives a request to execute writing from a compute node 120, which has accessed the LV, to a region to which a page is not allocated in a process of accessing the LV.

According to FIG. 18, in the page allocation process, the page allocation program 522 references the storage region segment management information 532, the page management information 533, the storage device management information 513, and the drive casing management information 514 and determines whether an unallocated allocatable page exists in a drive casing 140 belonging to the same network switch to which the concerned storage controller 131 belongs (step S301). When the page allocation program 522 determines that the unallocated allocatable page exists in the drive casing 140 belonging to the same network switch, the process proceeds to step S302. When the page allocation program 522 determines that the unallocated allocatable page does not exist in the drive casing 140 belonging to the same network switch, the process proceeds to step S303.

In step S302, the page allocation program 522 allocates the unallocated allocatable page determined in step S301 to an allocation destination region. After that, the page allocation program 522 terminates the page allocation process.

In step S303, the page allocation program 522 further references the switch connection management information 515, searches for an unallocated page within a drive casing 140 whose network distance (the number of switches via which data is transferred between the drive casing 140 and the storage controller 131) from the concerned storage controller 131 is the shortest, and allocates the unallocated page found in the search to an allocation destination region. After that, the page allocation program 522 terminates the page allocation process.

In the page allocation process, since a network path between the driving casing 140 and the storage controller 131 (storage device 130) that has received the request to execute the writing from the compute node 120 to the region to which a page is not allocated is minimized by allocating an unallocated page by the process of step S302 or S303, the amount of data to be transferred between the storage controller 131 and the drive casing 140 can be also minimized.

As a derivation example, the distributed computing system 10 according to the first embodiment may migrate, for an LV (for example, a thin provisioning volume) that enables a storage region to be dynamically allocated, a page between drive casings 140 belonging to different network switches based on an access frequency of each page or the like when a drive casing 140 whose network path is the shortest does not have an available page or the like.

As described above, in the distributed computing system 10 according to the first embodiment, in the allocation of an LV to a compute node 120 (requesting server), a storage device 130 whose network distance from the requesting server is the shortest can be allocated to a storage device that provides the LV, and a driving casing 140 whose network distance from the requesting server is the shortest can be allocated to a driving casing that provides a storage region for the LV. Specifically, to minimize a network distance (or to minimize the number of network switches), a storage device 130 and a drive casing 140 that belong to the same network switch (local network 110) to which the compute node 120 belongs are prioritized to be allocated (steps S104 and S109 illustrated in FIG. 16, step S203 illustrated in FIG. 17, and step S302 illustrated in FIG. 18). When the concerned components that belong to the same network switch are not found, a storage device 130 whose network path to the compute node 120 is the shortest and a drive casing 140 whose network path to the compute node 120 is the shortest (or the numbers of network switches are the smallest) are prioritized next (steps S105 and S110 illustrated in FIG. 16, step S204 illustrated in FIG. 17, and step S303 illustrated in FIG. 18). In this case, a storage device 130 whose network distance is not the shortest but is short and whose resource utilization is low, and a drive casing 140 that has a large available capacity may be selected based on resource utilization of the storage devices 130, available capacities of the drive casings 140, and the like.

In the first embodiment, in the distributed computing system 10 in which a storage resource is shared between network segments by allocating the resource so that a network distance between components via a storage device 130 that provides an LV is minimized under the condition that a specification of an LV allocation request is satisfied, when the method in which data is transferred between the compute nodes 120 and the drive casings 140 via the storage devices 130 is used, data can be transferred between a compute node 120 and a drive casing 140 via a minimized network path, and thus it is possible to avoid a bottleneck for the performance of the network and achieve the high-performance scalable resource management function.

Although FIG. 1 illustrates, as the example of the configuration of the distributed computing system 10, the configuration in which the compute nodes 120, the storage devices 130, and the drive casings 140 are connected to the same network switch (local network 110) in each of the racks 100, the configurations of the racks 100 included in the distributed computing system 10 according to the first embodiment are not limited to this. For example, the distributed computing system 10 according to the first embodiment may have a configuration in which compute nodes 120 and storage devices 130 are connected to the same network switch (local network 110) in a certain rack 100, and only drive casings 140 are connected to another network switch (local network 110) in another rack 100.

Even when the distributed computing system 10 has the foregoing rack configuration, the distributed computing system 10 can execute the LV allocation process (including the LV generation process or the page allocation process) to allocate an LV to a compute node 120 (requesting server), thereby allocating a storage device 130 whose network distance from the requesting server is the shortest to a storage device that provides the LV, and allocating a drive casing 140 whose network distance from the requesting server is the shortest to a drive casing that provides a storage region for the LV. The managing server 400 or the like can use the switch connection management information 515 to determine that the components exist in the same rack, and can determine that the components connected to the same network switch are installed in the same rack.

(2) Second Embodiment

A second embodiment of the invention is described below.

In the foregoing first embodiment of the invention, in the distributed computing system 10 that uses the method in which data is transferred between the compute nodes 120 and the drive casings 140 via the storage devices 130, resources (storage device that provides an LV and a drive casing that provides a storage region for the LV) are allocated so that a network distance between components that are a compute node 120 and a storage device 130 and a network distance between components that are the storage device 130 and a drive casing 140 are minimized.

The second embodiment of the invention describes a method of allocating resources in a distributed computing system 20 that can use a method in which data is directly transferred between compute nodes 120 and drive casings 140 without storage devices 130. The second embodiment describes features different from the first embodiment. Constituent components and processes that are common to the first embodiment are indicated by the same reference signs as those described in the first embodiment, and repetitive descriptions thereof are omitted.

Figure 19:
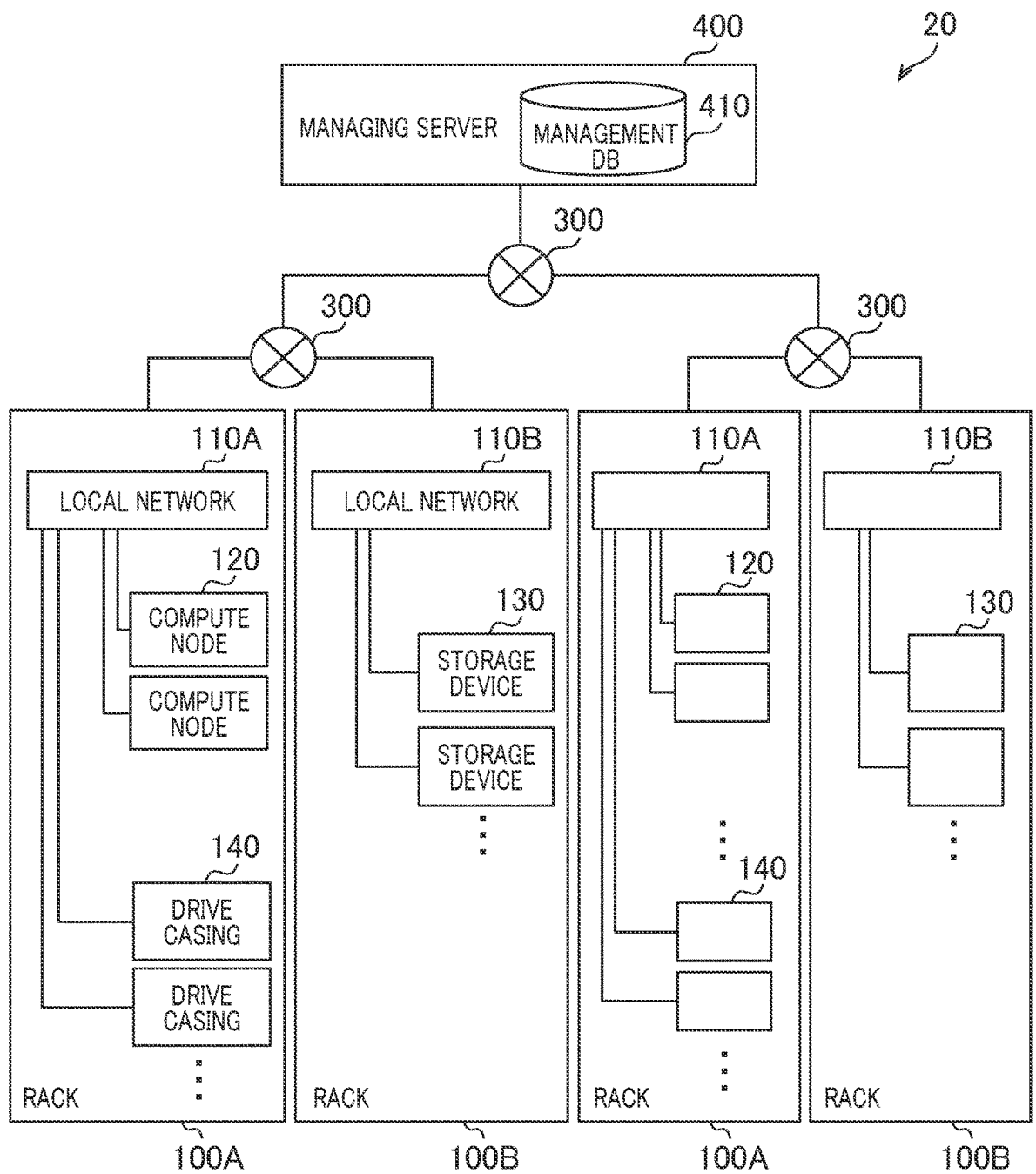
FIG. 19 is a diagram illustrating an example of a configuration of a distributed computing system according to a second embodiment.

FIG. 19 is a diagram illustrating an example of a configuration of the distributed computing system 20 according to the second embodiment. As illustrated in FIG. 19, the distributed computing system 20 according to the second embodiment is configured such that a plurality of racks 100A and 100B are connected to each other via the global network 300. The racks 100A and 100B are connected to the managing server 400 via the global network 300.

The rack 100A represents a group of IT devices connected to the same local network 110A (network switch). The rack 100B represents a group of IT devices connected to the same local network 110B (network switch). Each of the racks 100A and 100B may not be necessarily a single physical cabinet.

In the rack 100A, one or more compute nodes 120 and one or more storage devices 130 are connected to the local network 110A. In the rack 100B, one or more drive casings 140 are connected to the local network 110B. The local network 110A and the local network 110B are connected to each other via the global network 300. Specifically, the compute nodes 120 and storage devices 130 of the rack 100A and the drive casings 140 of the rack 100B do not belong to and are not connected to the same local network 110.

In the second embodiment, in the distributed computing system 20 configured in the foregoing manner, when a compute node in which an LV is to be mounted and a drive casing that provides a storage region (storage region segment) for the LV are allocated to and belong to the same local network switch (for example, the local network 110A), a network path via which data is transferred between the compute node 120 and the drive casing 140 due to access to the LV can be closed only in the local network 110A, and thus high-speed data transfer can be achieved.

In the second embodiment, when a drive casing that provides a storage region for an LV cannot be allocated to and belong to the same local network switch to which a compute node to which the LV is to be mounted belongs, the drive casing is allocated to a drive casing whose network distance from the foregoing compute node is the shortest, and thus high-speed data transfer can be achieved, compared to the case where another drive casing 140 is selected.

Features different from the first embodiment are mainly described below. Specifically, processes (LV allocation process, LV generation process, and page allocation process) to be executed by the foregoing distributed computing system 20 according to the second embodiment to allocate resources are mainly described below.

In the second embodiment, a procedure for the LV allocation process maybe the same as that described in the first embodiment (refer to FIG. 16). However, when the distributed computing system 20 has the configuration illustrated in FIG. 19, the storage devices 130 are not connected to the same network switch to which the compute nodes 120 belong, answers to the branch determination of steps S103 and S108 illustrated in FIG. 16 are NO, and a storage device 130 that provides an LV is determined in the process of step S105 or S109.

Figure 20:
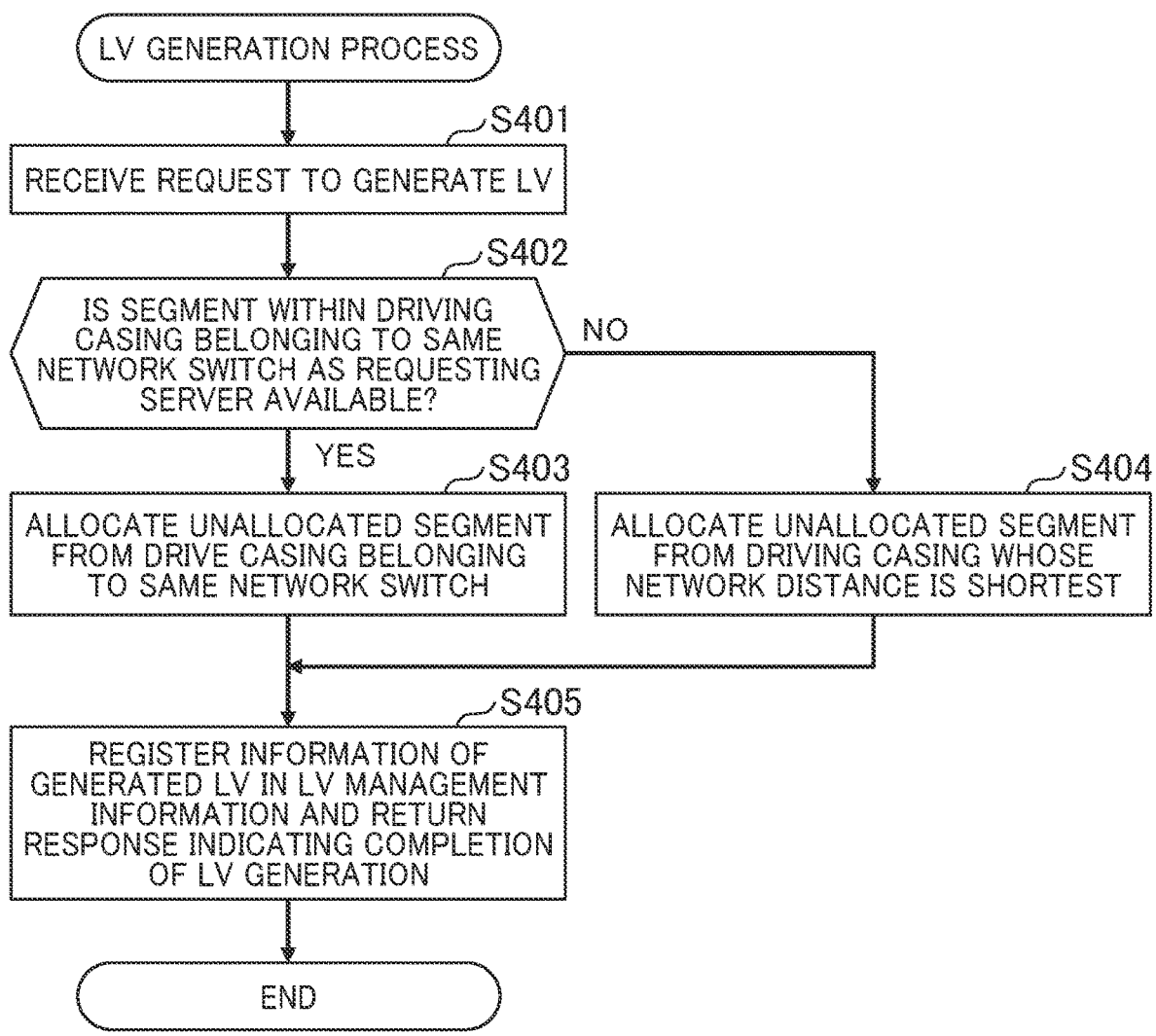
FIG. 20 is a flowchart illustrating an example of a procedure for an LV generation process according to the second embodiment.

Next, an LV generation process according to the second embodiment is described. FIG. 20 is a flowchart illustrating an example of a procedure for the LV generation process according to the second embodiment.

According to FIG. 20, the LV generation program 521 receives an LV generation request from the managing server 400 (step S401). The process of step S401 is the same as step S201 illustrated in FIG. 17 and described in the first embodiment.

Then, the LV generation program 521 references the compute node management information 512, the drive casing management information 514, and the storage region segment management information 532 and determines whether an LV can be generated according to the LV generation request by allocating a storage region segment 140-1 within a drive casing 140 belonging to and connected to the same network switch to which a compute node 120 that is a requesting server belongs (step S402). When the LV generation program 521 determines that the storage region segment 140-1 within the drive casing 140 belonging to the same network switch is available in the determination of step S402, the process proceeds to step S403. When the LV generation program 521 determines that the storage region segment 140-1 is not available in the determination of step S402, the process proceeds to step S404.

Then, in step S403, the LV generation program 521 allocates a necessary capacity (capacity requested for the LV in accordance with the LV generation request) of the unallocated storage region segment 140-1 from the drive casing 140 determined as being available in step 402, and the LV generation program 521 generates the LV. On the other hand, in step S404, the LV generation program 521 further references the switch connection management information 515 and allocates a necessary capacity (capacity requested for the LV in accordance with the LV generation request) of an unallocated storage region segment 140-1 from a drive casing 140 whose network distance from the requesting server (compute node 120) is the shortest, and the LV generation program 521 generates the LV.

Then, in step S405, the LV generation program 521 registers information of the LV generated in step S403 or S404 in the LV management information 531, returns a response indicating the completion of the generation of the LV to the managing server 400 that has provided the LV generation request, and terminates the LV generation process. This process of step S405 is the same as step S205 illustrated in FIG. 17 and described in the first embodiment.

In the LV generation process according to the second embodiment, a network distance between a compute node 120 (requesting server) to which an LV is to be allocated and a drive casing 140 that provides a storage region segment for the LV can be minimized by generating the LV in the process of step S403 or S404 under the condition that a specification of a request (LV allocation request information 502) to allocate the LV is satisfied.

Figure 21:
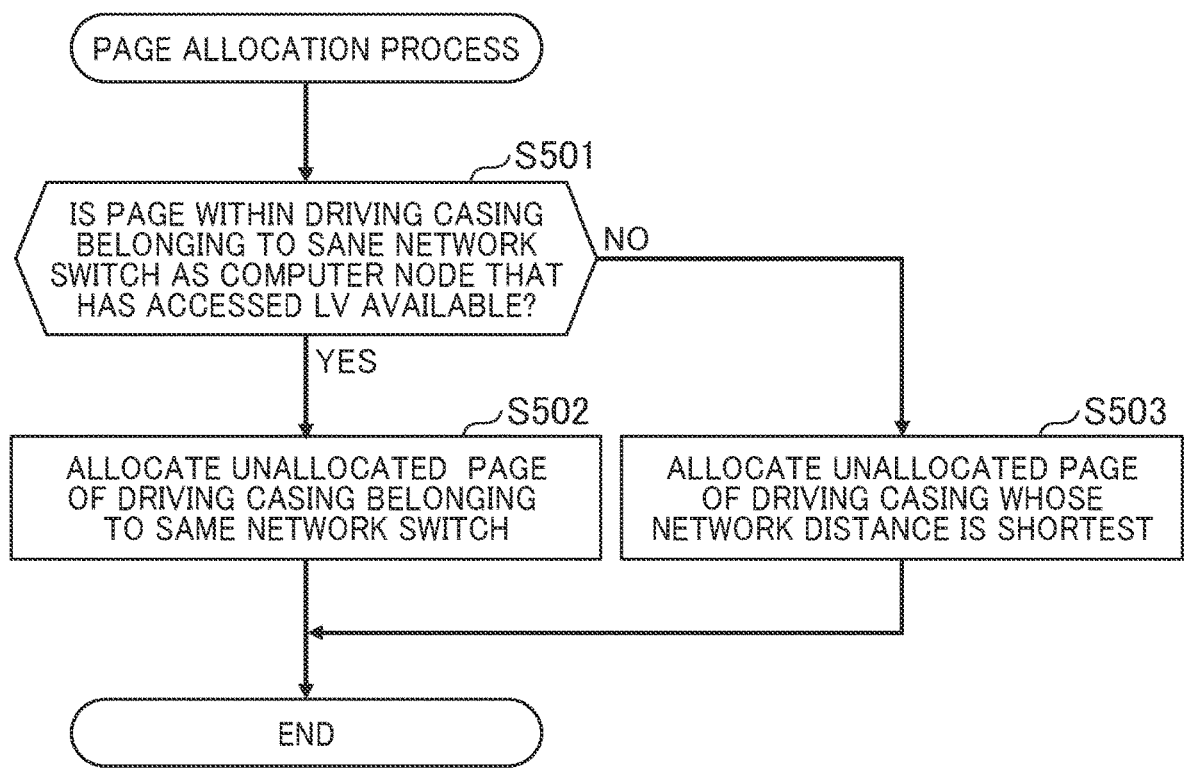
FIG. 21 is a flowchart illustrating an example of a procedure for a page allocation process according to the second embodiment.

Next, a page allocation process according to the second embodiment is described. FIG. 21 is a flowchart illustrating an example of a procedure for the page allocation process according to the second embodiment. The page allocation process is executed when a storage controller 131 receives a request to execute writing from a compute node 120 that has accessed an LV to a region to which a page is not allocated in a process of accessing the LV.

According to FIG. 21, first, the page allocation program 522 references the LV management information 531, the storage region segment management information 532, the page management information 533, the compute node management information 512, and the drive casing management information 514 and determines whether an unallocated allocatable page exists in a drive casing 140 belonging to the same network switch to which a compute node 120 that has accessed an LV belongs (step S501). When the page allocation program 522 determines that the unallocated allocatable page exists in the drive casing 140 belonging to the same network switch, the process proceeds to step S502. When the page allocation program 522 determines that the unallocated allocatable page does not exist in the drive casing 140 belonging to the same network switch, the process proceeds to step S503.

In step S502, the page allocation program 522 allocates the unallocated allocatable page determined in step S501 to an allocation destination region. In step S503, the page allocation program 522 further references the switch connection management information 515 and searches for an unallocated page within a drive casing 140 whose network distance (the number of switches via which data is transferred between the drive casing and the compute node 120) from the compute node 120 that has accessed the LV is the shortest. The page allocation program 522 allocates the unallocated page found in the search to an allocation destination region. After the page allocation program 522 terminates the allocation of the unallocated page in step S502 or S503, the page allocation program 522 terminates the page allocation process.

In the page allocation process according to the second embodiment, a network distance between a compute node 120 to which an LV is to be allocated (or that has accessed an LV) and a drive casing 140 that provides a page for the LV can be minimized by allocating an unallocated page in the process of step S502 or S503 under the condition that a specification of a request (LV allocation request information 502) to allocate the LV is satisfied.

As described above, in the distributed computing system 20 according to the second embodiment, in the allocation of an LV to a compute node 120 (requesting server), a storage device that provides the LV is allocated to a storage device whose network distance from the requesting server is the shortest under the condition that a specification of a request (LV allocation request information 502) to allocate the LV is satisfied (refer to steps S105 and S109 illustrated in FIG. 16). In addition, in the distributed computing system 20 according to the second embodiment, a drive casing that provides a storage region (storage region segment or page) for the LV is not selected from drive casings belonging to the same network switch to which the storage device 130 (storage controller 131) that provides the LV belongs, and is allocated to a drive casing 140 whose network distance from the compute node 120 (that has accessed the LV) having the LV mounted therein (refer to step S405 or S404 illustrated in FIG. 20 and step S502 or S503 illustrated in FIG. 21).

In the second embodiment, in the distributed computing system 20, storage resources are shared between the network segments by allocating resources such that a network distance between components that are a compute node 120 having an LV mounted therein and a drive casing 140 that provides a storage region for the LV is the shortest (or minimized) under the condition that a specification of a request to allocate the LV is satisfied. In the distributed computing system 20, when the method in which data is transferred between the compute nodes 120 and the drive casings 140 without the storage devices 130 is used, data can be directly transferred between a compute node 120 and a drive casing 140 via a minimized network path. Therefore, it is possible to avoid a bottleneck for the performance of the network and achieve a high-performance scalable resource management function.

Especially, like the configuration of the rack 100A illustrated in FIG. 19, when a compute node in which an LV is to be mounted and a drive casing that provides a storage region for the LV can be allocated to and belong to the same network switch (in the same rack 100), a network path via which data is transferred between the computer node 120 and the drive casing 140 can be closed in the local network 110A, and thus the highest data transfer can be achieved.

The invention is not limited to the foregoing embodiments and includes various modifications. The embodiments are described to clearly explain the invention in detail and are not limited to all the configurations described above. In addition, a part of configurations described in any of the embodiments can be replaced with a configuration described in another one of the embodiments. A configuration described in any of the embodiments can be added to a configuration described in another one of the embodiments. Furthermore, a configuration described in any of the embodiments can be added to, removed from, or replaced with a configuration described in another one of the embodiments.

In addition, a part or all of the foregoing configurations, functions, processing units, processing sections, and the like may be achieved with hardware, for example, by designing an integrated circuit. Furthermore, the foregoing configurations, functions, and the like may be achieved with software by causing a processor to interpret and execute a program for achieving the functions. Information of the program that achieves the functions, the table, a file, and the like may be stored in a recording device, such as a memory, a hard disk, or a solid state drive (SSD), or a recording medium, such as an IC card, an SD card, or a DVD.

Control lines and information lines that are considered to be necessary for the explanation are illustrated in the drawings, and all control lines and information lines of a product may not be necessarily illustrated in the drawings. In practice, almost all the configurations may be considered to be connected to each other.

What is claimed is:

1. A distributed computing system comprising a plurality of components connected to each other via a network, wherein
each of the components includes
a plurality of compute nodes that activate an application and issue an input and output request to input and output data on the application,
a plurality of drives that physically store the data to be input and output in accordance with the input and output request, and
a plurality of storage devices that execute a process on the data to be input to and output from the drives,
wherein, the network has a plurality of network switches and is configured in layers, and
wherein, upon allocating a storage region to a compute node among the compute nodes, a managing unit selects one of a storage device related to the storage region and a drive related to the storage region, based on a network distance between the compute node and the storage device and the network distance between the storage device and the drive,
wherein the network distance is determined based on the number of network switches via which data is transferred between the compute node and the storage device and between the storage device and the drive.

2. The distributed computing system according to claim 1, further comprising switch connection management information storing a connection relationship between the network switches, wherein
the managing unit uses the switch connection management information to determine the network distance.

3. The distributed computing system according to claim 1, wherein
the drives have a mode in which the drives transmit and receive data to and from the compute nodes without the storage devices,
the managing unit selects another drive related to another storage region to be allocated, based on network distances between the compute nodes and the another drive.

4. A resource allocation method of a distributed computing system including a plurality of components connected to each other via a network, wherein
each of the components includes
a plurality of compute nodes that activate an application and issue an input and output request to input and output data on the application,
a plurality of drives that physically store the data to be input and output in accordance with the input and output request, and
a plurality of storage devices that execute a process on the data to be input to and output from the drives,
the network has a plurality of network switches and is configured in layers, and
upon allocating a storage region to a compute node among the compute nodes, a managing unit selects one of a storage device related to the storage region and a drive related to the storage region, based on a network distance between two of the compute node and the storage device and the network distance between the storage device and the drive,
wherein the network distance is determined based on the number of network switches via which data is transferred between the compute node and the storage device and between the storage device and the drive.

* * * * *